UNITED STATES PATENT OFFICE.

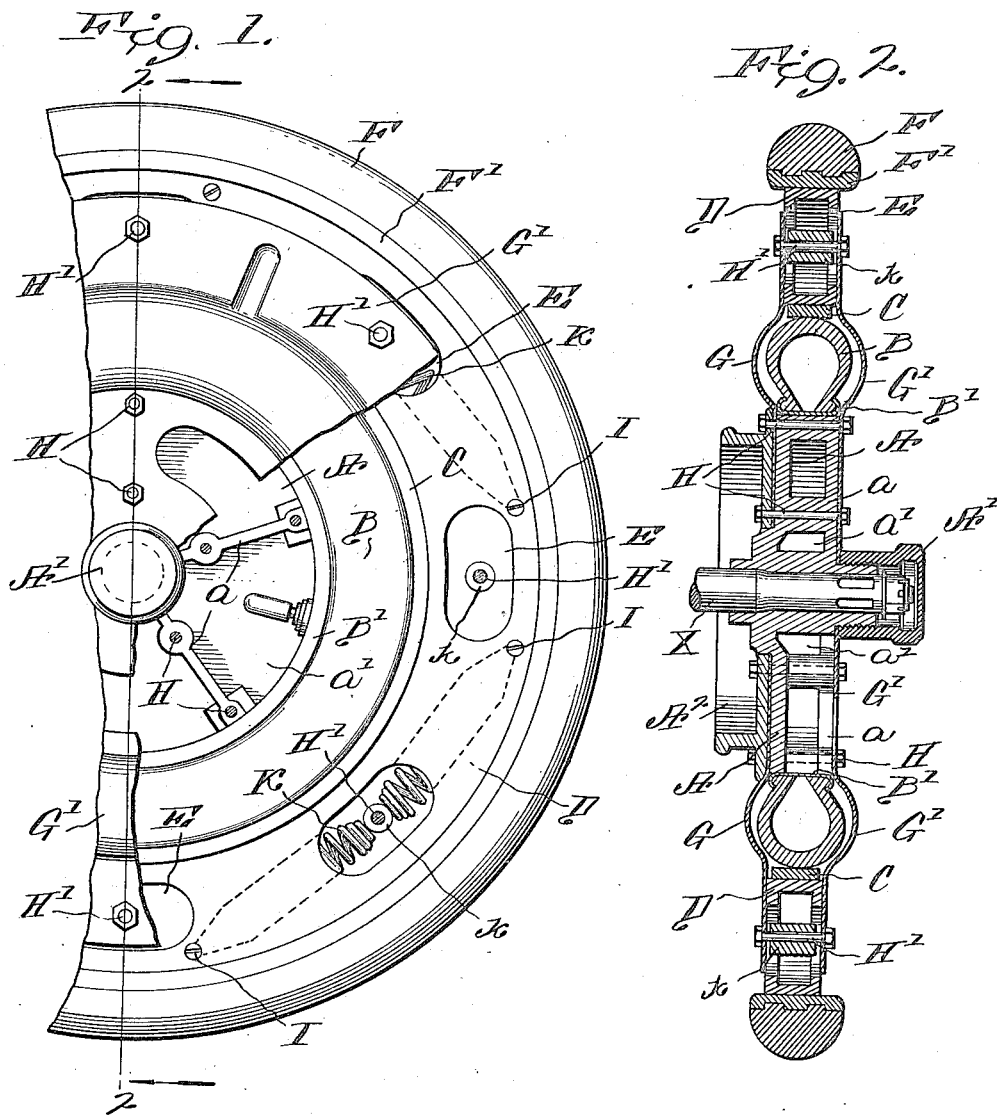

FERNANDO RAMIREZ DE DAMPIERRE, OF MADRID, AND JUSTO GONZALO, OF VALENCIA, SPAIN.

VEHICLE-WHEEL.

1,222,538.  Specification of Letters Patent.  Patented Apr. 10, 1917.

Application filed December 14, 1914. Serial No. 877,234.

*To all whom it may concern:*

Be it known that we, FERNANDO RAMIREZ DE DAMPIERRE and JUSTO GONZALO, subjects of the King of Spain, residing, respectively, at Madrid and Valencia, Spain, have invented certain new and useful Improvements in Vehicle-Wheels; and we do hereby declare the following to be a full, clear, and exact description of the invention, such as will enable others skilled in the art to which it appertains to make and use the same.

Our invention relates to that class of vehicle wheels in which there is an inner pneumatic tire mounted on a hub of suitable dimensions, an outer tire adapted to run upon the ground, and intermediate means for spacing the said tires apart and for permitting a relatively tangential movement of the outer tire on the inner.

Our invention also relates to improved means for lessening the wear on the inner pneumatic tire, as will be hereinafter described and claimed.

Reference is had to the accompanying drawings, in which:—

Figure 1 is a side elevation of a wheel constructed according to our invention, parts being broken away; and Fig. 2 shows a section along the line 2—2 of Fig. 1, looking in the direction of the arrows.

A represents a hub, preferably in the form of a casting with ribs *a* and hollow portions *a'*, which is either journaled on or fast to the axle X, and may be provided with the usual cap A' and the drum A² for the band brake.

Mounted on the periphery of this hub A is a pneumatic tire B of the usual or any preferred construction, attached, for instance, to the clencher rim B'. Exterior to said pneumatic tire B, and gripping the tread thereof, is the ring C which is of sufficient thickness and strength to stand the load placed upon it. Exterior to this ring C is a hollow ring D, which fits snugly over the ring C; but the contacting surfaces of the two rings are kept lubricated, as by means of graphite, or other suitable lubricant, so that the outer ring D may slip on the inner ring C in a tangential direction.

This outer ring D carries the rim F', on which the outer tire F is secured in any convenient way. This outer tire is preferably of solid rubber, or other suitable material adapted to stand the wear of the roadway.

The rim F', and outer tire carried thereby, is rigidly attached to the ring D. The hollow ring D is cut away, as at E, to permit the free passage through the openings of the bolts H', which connect the oppositely-disposed annular plates G and G', mounted on opposite sides of the wheel, which plates are rigidly attached to the hub in any convenient way, as by means of the bolts H. These plates G and G' are preferably of such shape as to inclose the inner tire B and rings C and D, so as to provide a smooth outer surface, and also to protect the inclosed parts from dust, mud, snow, rain, or other foreign matter.

These plates G are rigidly attached to the hub A by means of the bolts H, as before described, and they are connected near their outer edges to the outer ring D through the yielding connection formed by the bolts H' and the springs K, which springs are connected at one end to the sleeves *k* surrounding the bolts H', and at their outer ends to the bolts I secured to the hollow ring D, as shown in Fig. 2.

By this arrangement the springs K will permit a slight angular movement of the outer tire and the ring D on the ring C, in starting or stopping, or when the brakes are applied in coasting, or at other times when there is a sudden strain on the tread of the outer tire; the result being that there will be a slip of the ring D on the ring C, without material wear on the pneumatic tire B, while at the same time the advantages of the pneumatic tire are secured.

The result described is that we combine the advantages of a pneumatic tire with the economy and wearing properties of the solid tire, and greatly prolong the life of the pneumatic tire.

It will be noted that the ring C being made of metal, and able to resist deformation, contacts inside with the inner tire B and outside with the metal ring D; the engagement between the two rings being properly lubricated.

If the ring D were not permitted to slide over the ring C, but the latter ring were to slide on the inner tire B, there would be a rapid wearing away of the shoe of the inner tire, due to the compression of said shoe, and the rubbing of the shoe against the inside of the ring C. As the outer periphery of the wheel is subjected to strains in starting, stopping, coasting or the like, this wear is largely, in fact almost entirely, obviated by the slipping of the ring D over the ring C, as permitted by the springs K.

While we have shown one embodiment of the invention it will be obvious that various modifications might be made which could be used without departing from the spirit of our invention.

Having thus described our invention what we claim and desire to secure by Letters Patent of the United States is:—

In a wheel for vehicles, the combination with a hub member and a pneumatic tire mounted thereon, of a rigid metal ring secured to said pneumatic tire and adapted to grip same, a continuous hollow metal ring fitting over said first-mentioned ring and adapted to slide tangentially thereon, a rim and tire rigidly secured on said hollow metal ring, plates secured to said hub member on each side thereof and projecting over and inclosing said pneumatic tire, said first-mentioned ring and said hollow metal ring, bolts passing through openings in said hollow metal ring, and connecting said plates, and coil springs mounted in said hollow metal ring and connected at one end to said bolts and at the other end secured to said hollow metal ring, whereby the tangential slipping of said hollow metal ring relative to said hub is permitted, substantially as described.

In testimony whereof, I affix my signature.
FERNANDO RAMIREZ DE DAMPIERRE.
In testimony whereof, I affix my signature.
JUSTO GONZALO.